US008656238B2

(12) United States Patent
Lee et al.

(10) Patent No.: US 8,656,238 B2
(45) Date of Patent: Feb. 18, 2014

(54) FLIP-FLOP CIRCUIT AND SCAN FLIP-FLOP CIRCUIT

(75) Inventors: Hyoung-Wook Lee, Seoul (KR); Min-Su Kim, Hwaseong-si (KR); Chung-Hee Kim, Yongin-si (KR); Jin-Soo Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 302 days.

(21) Appl. No.: 13/049,427

(22) Filed: Mar. 16, 2011

(65) Prior Publication Data

US 2011/0231723 A1 Sep. 22, 2011

(30) Foreign Application Priority Data

Mar. 18, 2010 (KR) ........................ 10-2010-0024255

(51) Int. Cl.
*G01R 31/28* (2006.01)
(52) U.S. Cl.
USPC ........................................ 714/731; 714/726
(58) Field of Classification Search
USPC .................................. 714/731, 726
See application file for complete search history.

(56) References Cited

U.S. PATENT DOCUMENTS

| | | | | |
|---|---|---|---|---|
| 5,343,200 A * | 8/1994 | Matsui ........................... 341/139 |
| 5,805,513 A * | 9/1998 | Takahashi et al. ............. 365/201 |
| 6,023,179 A * | 2/2000 | Klass ............................. 327/211 |
| 6,374,393 B1 * | 4/2002 | Hirairi ........................... 716/111 |
| 6,411,543 B2 * | 6/2002 | Narui et al. .................... 365/149 |
| 6,480,439 B2 * | 11/2002 | Tokutome et al. ........ 365/189.15 |
| 7,391,250 B1 * | 6/2008 | Chuang .......................... 327/211 |
| 7,420,871 B2 * | 9/2008 | Chu ............................. 365/233.1 |
| 7,420,872 B2 * | 9/2008 | Yang et al. .................. 365/233.1 |
| 7,783,886 B2 * | 8/2010 | Walmsley ...................... 713/176 |
| 7,830,436 B2 * | 11/2010 | Sumi et al. .................... 348/300 |
| 7,868,949 B2 * | 1/2011 | Moehlmann et al. ......... 348/536 |
| 8,072,522 B2 * | 12/2011 | Taura ............................ 348/300 |
| 2001/0001598 A1 * | 5/2001 | Narui et al. .................... 365/149 |
| 2002/0039323 A1 * | 4/2002 | Tokutome et al. ............ 365/233 |
| 2005/0134347 A1 * | 6/2005 | Rusu et al. ..................... 327/199 |
| 2006/0221723 A1 * | 10/2006 | Kang et al. ................ 365/189.05 |
| 2007/0083491 A1 * | 4/2007 | Walmsley et al. ................ 707/3 |
| 2008/0157842 A1 * | 7/2008 | Kim ................................ 327/211 |
| 2009/0244375 A1 * | 10/2009 | Moehlmann et al. ......... 348/512 |
| 2009/0296508 A1 * | 12/2009 | Cho ........................... 365/210.12 |
| 2010/0308864 A1 * | 12/2010 | Lee et al. ......................... 326/46 |
| 2010/0315126 A1 * | 12/2010 | Kim ................................. 326/98 |
| 2010/0315144 A1 * | 12/2010 | Lee et al. ...................... 327/211 |
| 2011/0025420 A1 * | 2/2011 | Sumi et al. .................... 330/278 |

* cited by examiner

*Primary Examiner* — Cynthia Britt
(74) *Attorney, Agent, or Firm* — Lee & Morse, P.C.

(57) ABSTRACT

A scan flip-flop circuit includes a pulse generator, a dynamic input unit and a latch output unit. The pulse generator generates a pulse signal which is enabled in synchronization with a rising edge of a clock signal in a normal mode, and is selectively enabled in synchronization with the rising edge of the clock signal in response to a logic level of a scan input signal in a scan mode. The dynamic input unit precharges a first node to a power supply voltage in a first phase of the clock signal, selectively discharges the first node in the normal mode, and discharges the first node in the scan mode. The latch output unit latches an internal signal provided from the first node to provide an output data, and determines whether the output data is toggled based on the clock signal and a previous state of the output data.

20 Claims, 16 Drawing Sheets

220a

220b

FLIP-FLOP CIRCUIT AND SCAN FLIP-FLOP CIRCUIT

This application claims priority under 35 U.S.C. §119 to Korean Patent Application No. 10-2010-0024255, filed on Mar. 18, 2010, in the Korean Intellectual Property Office, and entitled: "Flip-Flop Circuit and Scan Flip-Flop Circuit," which is incorporated by reference herein in its entirety.

BACKGROUND

1. Field

Embodiments relate to semiconductor circuits, and more particularly to flip-flop circuits and scan flip-flop circuits.

2. Description of the Related Art

Scan testing may be used to test semiconductor chips. In scan-based semiconductor designs, a series of registers may be connected to form serial shift register chains to capture any combinational logic faults among the serially-connected registers.

Conventional circuits utilizing scan circuitry may require additional hardware, such as additional transistors, which may decrease an output time of the circuit, increase a hold time of a signal, increase power consumption and result in a degraded performance of the circuit.

SUMMARY

One or more embodiments may provide a flip-flop circuit capable of operating faster and reducing power consumption relative to comparable conventional circuits.

One or more embodiments may provide a scan flip-flop circuit capable of operating fast and reducing power consumption.

One or more embodiments may provide a scan flip-flop circuit configured for reduced power consumption and increased operating speed by reducing toggling in a latch output unit.

One or more embodiments may provide a scan flip-flop circuit includes a pulse generator, a dynamic input unit and a latch output unit. The pulse generator generates a pulse signal which is enabled in synchronization with a rising edge of a clock signal in a normal mode, and is selectively enabled in synchronization with the rising edge of the clock signal in response to a logic level of a scan input signal in a scan mode. The dynamic input unit precharges a first node to a power supply voltage in a first phase of the clock signal, selectively discharges the first node based on input data in a second phase of the clock signal in the normal mode, and discharges the first node in response to the scan signal in the scan mode. The latch output unit latches an internal signal provided from the first node to provide an output data, and determines whether the output data is toggled based on at least a logic level of the clock signal and a previous state of the output data.

In some embodiments, the pulse generator may include a first inverter that inverts the clock signal, a first NAND gate that performs a NAND operation on a scan enable signal and an inverted signal of the scan input signal where the scan enable signal indicates one of the normal mode and the scan mode, a second NAND gate that performs a NAND operation on an output of the first NAND gate and an output of the first inverter, a delay unit that delays an output of the second NAND gate, the delay unit including second and third inverters and a NOR gate that performs a NOR operation on the output of the first inverter and an output of the delay unit to provide the pulse signal.

The latch output unit may include a third NAND gate that performs on a NAND operation on the output of the first inverter (an inverted clock signal) and the output data and a fourth NAND gate that performs on a NAND operation on the internal signal and an output of the third NAND gate to provide the output data.

In some embodiments, the pulse generator may include a first inverter that inverts the clock signal; a first NAND gate that performs a NAND operation on a scan enable signal and an inverted signal of the scan input signal, the scan enable signal indicating one of the normal mode and the scan mode; a second NAND gate that performs a NAND operation on an output of the first NAND gate and an output of the first inverter; a second inverter that inverts an output of the second NAND gate; a third NAND gate that performs a NAND operation on an output of the second inverter and the clock signal; a third inverter that inverts an output of the third NAND gate to provide the pulse signal; and a fourth NAND gate that performs a NAND operation on the output of the first inverter and the output of the third NAND gate to provide a delay clock signal which is delayed with respect to the clock signal The latch unit may include a fourth inverter that inverts the output data; first and second p-type metal oxide semiconductor (PMOS) transistors, cascade-connected between a power supply voltage and an output node, the first PMOS transistor having a gate receiving an output of the fourth inverter, the second PMOS transistor having a gate receiving the delayed clock signal, the output data being provided at the output node; a third PMOS transistor, first and second n-type MOS (NMOS) transistors, cascade-connected between the power supply voltage and a ground voltage, the third PMOS transistor having a gate connected to the first node, the first NMOS transistor receiving the delayed clock signal and the second NMOS transistor having a gate connected to the first node; and a third NMOS transistor, connected to the output node and a connecting node, having a gate receiving an output of the fourth inverter, the first and second NMOS transistors being connected to each other at the connecting node.

In some embodiments, the pulse generator may include a first inverter that inverts the clock signal; a first NAND gate that performs a NAND operation on a scan enable signal and an inverted signal of the scan input signal, the scan enable signal indicating one of the normal mode and the scan mode; a second NAND gate that performs a NAND operation on an output of the first NAND gate and an output of the first inverter; a second inverter that inverts an output of the second NAND gate; a third NAND gate that performs a NAND operation on an output of the second inverter and the clock signal; and a third inverter that inverts an output of the third NAND gate to provide the pulse signal.

The latch output unit may include a fourth NAND gate that performs on a

NAND operation on the output of the first inverter (an inverted clock signal), the output of the third NAND gate and the output data; and a fifth NAND gate that performs on a NAND operation on the internal signal and an output of the fourth NAND gate to provide the output data.

In some embodiments, the dynamic input unit may include a precharging unit, connected to a power supply voltage, which precharges the first node to a level of the power supply voltage in response to the clock signal; a data input unit, connected to the first node and a second node, which forms a first path between the first and second nodes in response to at least one input data in the normal mode; a scan unit, connected to the first and second node in parallel with the data input unit, which forms a second path between the first and second nodes in the scan mode; and a discharging unit, connected to the second node and a ground voltage, which discharges the second node in response to the pulse signal.

The dynamic input unit may further include an inverter that inverts a logic level of the first node; and a latch unit, connected to an output of the inverter and the first node, which has a tri-state inverter that selectively inverts the output of the inverter in response to the clock signal and the pulse signal.

In some embodiments, the latch output unit may include a first tri-state inverter, connected to the first node and an output node, which receives the clock signal and an inverted clock signal that the clock signal is inverted, the output data being provided at the output node; an inverter that inverts the output data; and a second tri-state inverter, connected to an output terminal of the inverter and the output node, which receives the clock signal and the inverted clock signal.

In some embodiments, the latch output unit may include a clock-based inverter which selectively inverts a logic level of the first node in response to the clock signal to provide the output data; and a latch unit that latches the output data.

In some embodiments, the latch output unit may include a clock-based inverter which selectively inverts a logic level of the first node in response to the clock signal to provide the output data; an inverter that inverts the output data; and a tri-state inverter, connected to an output terminal of the inverter and the an output node, which receives the clock signal and an inverted clock signal that the clock signal is inverted, the output data being provided at the output node.

According to some example embodiments, a flip-flop circuit includes a pulse generator, a dynamic input unit and a latch output unit. The pulse generator generates a pulse signal based on a clock signal, and the pulse signal is synchronized with a rising edge of the clock signal with a delay and has an activation interval shorter than the clock signal. The dynamic input unit precharges an evaluation node to a power supply voltage in a first phase of the clock signal, and selectively discharges the evaluation node in response to input data and the pulse signal in a second phase of the clock signal. The latch output unit latches an internal signal provided from the evaluation node to provide an output data, and determines a present state of the output data based on a logic level of the clock signal and a previous state of the output data.

In some embodiments, the pulse generator may include a delay unit that delays and inverts the clock signal; a NAND gate that performs an NAND operation on an output of the delay unit and the clock signal; and an inverter that inverts an output of the NAND gate to provide the pulse signal.

In some embodiments, the pulse generator may include a delay unit that delays and inverts the clock signal, the delay unit including first through third inverters which are cascade-connected; a first NAND gate that performs an NAND operation on an output of the delay unit and the clock signal; a fourth inverter that inverts an output of the first NAND gate to provide the pulse signal; and a second NAND gate that performs an NAND operation on the output of the first NAND gate and an output of the first inverter to provide a delayed clock signal.

In some embodiments, the pulse generator may include an inverter that inverts the clock signal; a delay unit that delays and inverts an output of the inverter; and a NOR gate that performs a NOR operation on outputs of the inverter and the delay unit to provide the pulse signal.

In some embodiments, the dynamic input unit may include a PMOS transistor, connected between a power supply voltage and the evaluation node, which has a gate receiving the clock signal; a data input unit, connected to the evaluation node, which receives the input data; and a NMOS transistor, connected between the data input unit and a ground voltage, which has a gate receiving the pulse signal.

In some embodiments, the dynamic input unit may further include a latch unit, connected between the evaluation node and the latch output unit, which latches the internal signal.

BRIEF DESCRIPTION OF THE DRAWINGS

Features and advantages will become more apparent to those of ordinary skill in the art by describing in detail exemplary embodiments with reference to the attached drawings, in which.

DETAILED DESCRIPTION

Figure 1:
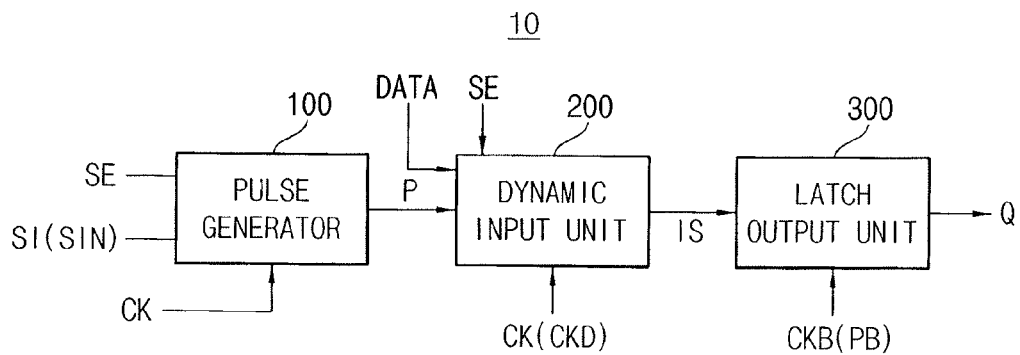
FIG. 1 illustrates a block diagram of an exemplary embodiment of a scan flip-flop circuit.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout the specification.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a scan flip-flop circuit 10.

Referring to FIG. 1, the scan flip-flop circuit 10 may include a pulse generator 100, a dynamic input unit 200, and a latch output unit 300.

The pulse generator 100 may generate a pulse signal P that may be enabled in synchronization with a rising edge of a clock signal CK in a normal mode. The pulse signal P may be selectively enabled in synchronization with the rising edge of the clock signal CK in response to a logic level of a scan input signal SI in a scan mode. Operation modes, e.g., the normal mode and the scan mode, may be determined by a scan enable signal SE. For example, when the scan enable signal SE is a logic low level, the operation mode may correspond to the normal mode. For example, when the scan enable signal SE is a logic high level, the operation mode may correspond to the scan mode. In one or more other embodiments, operation mode may correspond to the normal mode when the scan enable signal SE is a logic high level, and the operation mode may correspond to the scan mode when the scan enable signal SE is a logic low level.

The dynamic input unit 200 may perform different operations according to a phase of the clock signal CK. For example, when the clock signal CK is in a first phase (a logic low level), the dynamic input unit 200 may perform a precharging operation. For example, when the clock signal CK is in a second phase (a logic high level), the dynamic input unit 200 may evaluate input data DATA according to the operation mode, or may perform discharge operations in response to the pulse signal P and the scan enable signal SE regardless of the input data DATA. For example, the dynamic input unit 200 may precharge a first node N1 (see, e.g., FIG. 2) or maintain a voltage level of the first node Ni according to the evaluation of the input data DATA in the normal mode during the second phase of the clock signal CK. For example, the dynamic input unit 200 may discharge the first node N1 or may maintain the voltage level of the first node Ni according to a logic level of the pulse signal P in the scan mode during the second phase of the clock signal CK. Detailed structures and operation of the dynamic input unit 200 will be described in detail later.

The latch output unit 300 may latch an internal signal IS provided from the first node Ni to provide output data Q. The latch output unit 300 may determine whether the output data Q is toggled based on a logic level of the clock signal CK (or, an inverted clock signal CKB) and a previous state of the output data Q.

In some exemplary embodiments, an inverted scan input signal SIN (i.e., a signal corresponding to an inverse of the scan input signal SI) may be applied to the pulse generator 100 in FIG. 1 instead of the scan input signal SI. In addition, a delayed clock signal CKD (i.e., a signal corresponding to the clock signal CK, but delayed, and in cases in which the delay corresponds to a half cycle of the clock signal CK, the delayed clock signal CKD may correspond to an inverse clock signal CKB) may be applied to the dynamic input unit 200 in FIG. 1 instead of the clock signal CK. When the delayed clock signal CKD is applied to the dynamic input unit 200 instead of the clock signal CK, the delayed clock signal CKD may also be applied to the latch output unit 300 instead of the clock signal CK. In various exemplary embodiments, when there is a description on the clock signal CK applied to the dynamic input unit 200 and the latch output unit 300, the description may include a case of the delayed clock signal CKD being applied to the dynamic input unit 200 and the latch output unit 300 and vice versa.

Figure 2:
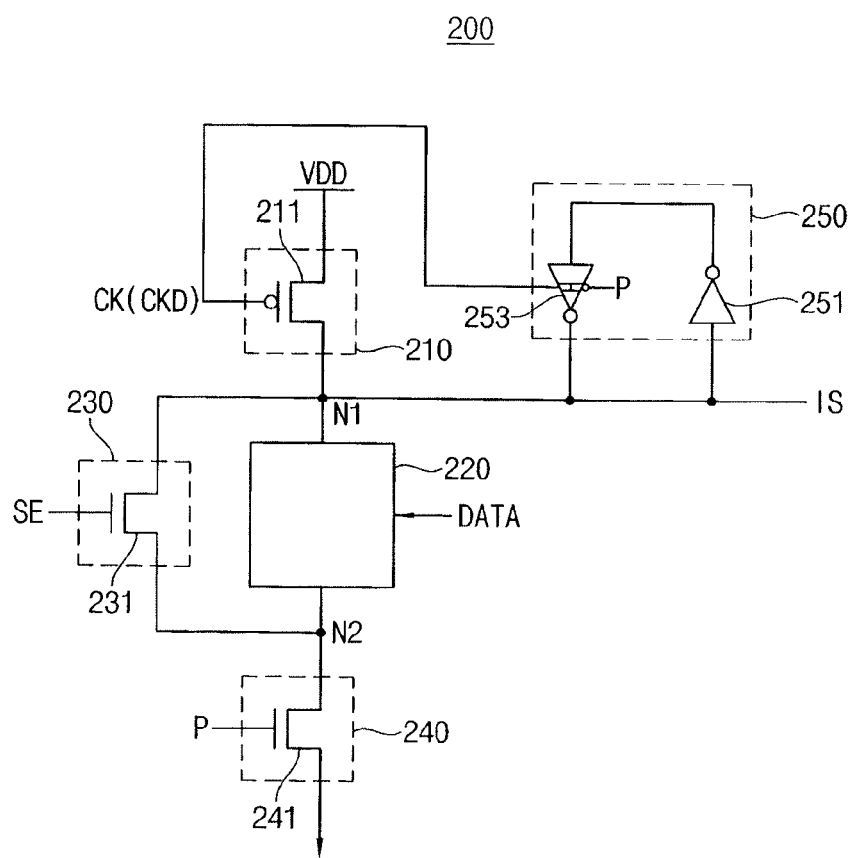
FIG. 2 illustrates a circuit diagram of an exemplary embodiment of the dynamic input unit of FIG. 1.

FIG. 2 illustrates a circuit diagram of an exemplary embodiment of of the dynamic input unit 200 of FIG. 1.

Referring to FIG. 2, the dynamic input unit 200 may include a precharging unit 210, a data input unit 220, a scan unit 230, a discharge unit 240 and a latch unit 250.

The precharging unit 210 may be connected between a power supply voltage VDD and the first node Ni. The precharging unit 210 may precharge the first node N1 to a level of the power supply voltage VDD in response to the clock signal CK (or the delayed clock signal CKD). The precharging unit 210 may include a p-type metal oxide semiconductor (PMOS) transistor 211 that has a gate receiving the clock signal CK.

The data input unit 220 may be connected between the first node Ni and a second node N2. The data input unit 220 may form a first path between the first node Ni and the second node N2 in response to at least one input data DATA in the normal mode.

The scan unit 230 may be connected between the first node N1 and the second node N2 in parallel with the data input unit 220. The scan unit 230 may form a second path between the first node N1 and the second node N2 in response to scan enable signal SE in the scan mode.

The discharging unit 240 may be connected between the second node N2 and a ground voltage. The discharging unit 240 may discharge the second node N2 in response to the pulse signal P. The discharging unit 240 may include an n-type metal oxide semiconductor (NMOS) transistor 241, which may include a gate receiving the pulse signal P.

The latch unit 250 may latch the internal signal IS provided from the first node Ni. The latch unit 250 may include an inverter 251 and a tri-state inverter 253, which may be back-to-back connected. The tri-state inverter 253 may receive the clock signal CK and the pulse signal P as control signals.

FIGS. 3A, 3B, 3C, and 3D illustrate exemplary embodiments of the data input unit 220 employable in the dynamic input unit 200 of FIG. 2. More particularly, e.g., a data input unit 220*a* of FIG. 3A, a data input unit 220*b* of FIG. 3B, or a data input unit 220*c* of FIG. 3C, or a data input unit 220*d* of FIG. 3D may be employed as the data input unit 200 of FIG. 1.

Figure 3A:
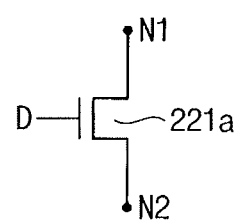
FIGS. 3A to 3D illustrate exemplary embodiments of the data input unit employable in the dynamic input unit of FIG. 2.

FIG. 3A illustrates an exemplary embodiment of a data input unit 220*a* when the input data DATA is one. Referring to FIG. 3A, the data input unit 220*a* may include a NMOS transistor 221*a*, which may include a gate receiving the input data D. In the exemplary embodiment of FIG. 3A, a conducting path may be formed according to a logic level of the input data D.

Figure 3B:
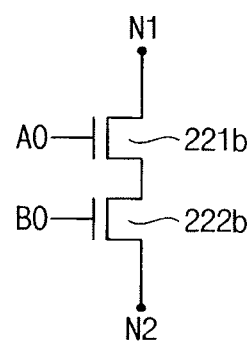

FIG. 3B illustrates an exemplary embodiment of a data input unit 220*b* when the input data DATA is two. Referring to FIG. 3B, the data input unit 220*b* may include cascade-connected (or serially connected) NMOS transistors 221*b* and 222*b*. One of the NMOS transistors, e.g., 221*b*, may include a gate receiving an input data A0, and the other of the NMOS transistors, e.g., 222*b*, may include a gate receiving an input data B0. In an embodiment of FIG. 3B, a conducting path may be formed when both of the input data AO and BO are logic high levels. The data input unit 220*b* of FIG. 3B may implement an AND logic.

Figure 3C:
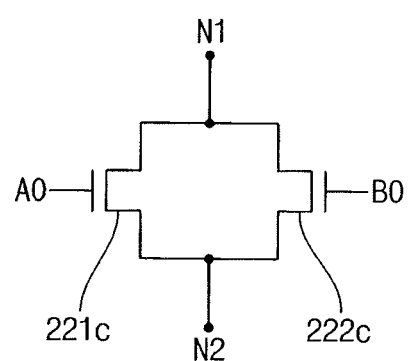

FIG. 3C illustrates an exemplary embodiment of the data input unit 220*c* when the input data DATA is two. Referring to FIG. 3C, the data input unit 220*c* may include two NMOS transistors 221*c* and 222*c*, which may be connected in parallel with respect to each other between the first and second nodes N1 and N2.

The NMOS transistor 221*c* has a gate receiving an input data A0, and the NMOS transistor 222*c* has a gate receiving an input data BO. In an embodiment of FIG. 3C, a conducting path may be formed when at least one of the input data A0 and B0 is logic high level. The data input unit 220*c* of FIG. 3C may implement an OR logic.

Figure 3D:
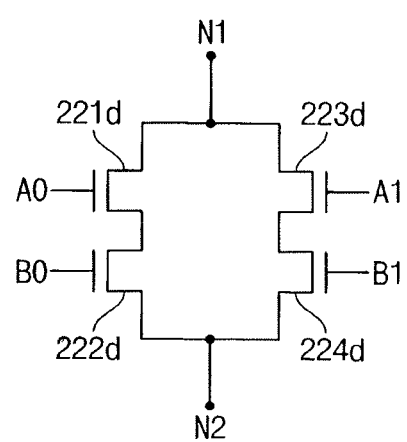

FIG. 3D illustrates an exemplary embodiment of the data input unit 220*d* when the input data DATA is four. Referring to FIG. 3D, the data input unit 220*d* may include four NMOS transistors 221*d*, 222*d*, 223*d* and 224*d*. Each of the NMOS transistors 221*d*, 222*d*, 223*d* and 224*d* may include a gate that receives each of four input data A0, BO, A1 and D1. The NMOS transistors 223*d* and 224*d* may be connected in series between the first and second nodes N1 and N2. The NMOS transistors 221*d* and 222*d* may be connected in series between the first and second nodes N1 and N2. In an embodiment of FIG. 3D, a conducting path may be formed according to a combination of logic levels of the four input data A0, B0, A1 and D1.

Figure 4A:
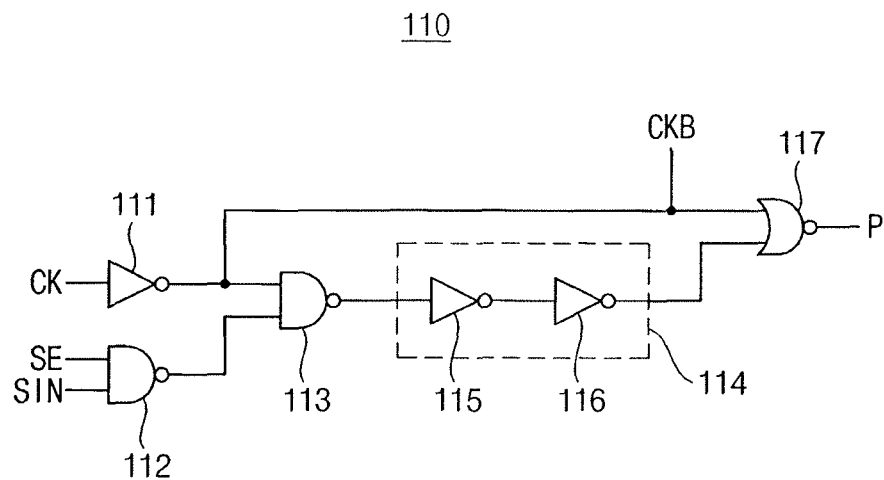
FIGS. 4A to 4C illustrate circuit diagrams of exemplary embodiments of the pulse generator in FIG. 1.
Figure 4B:
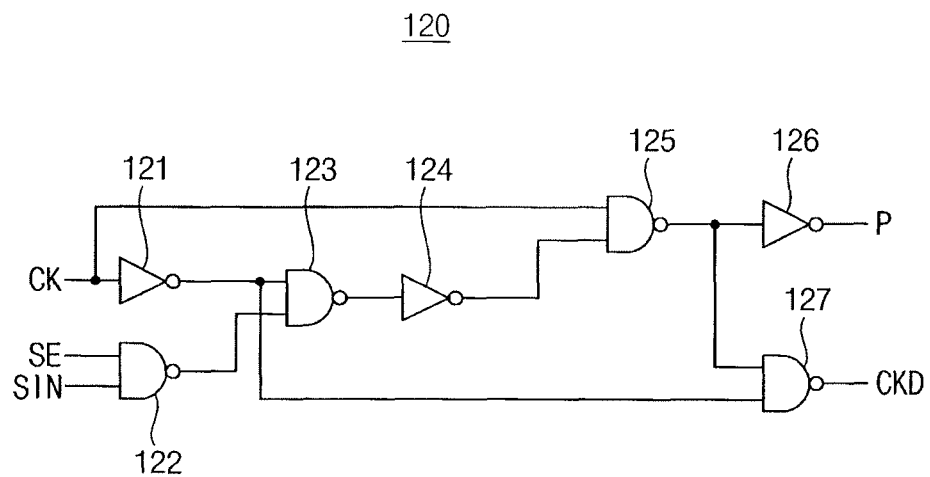
Figure 4C:
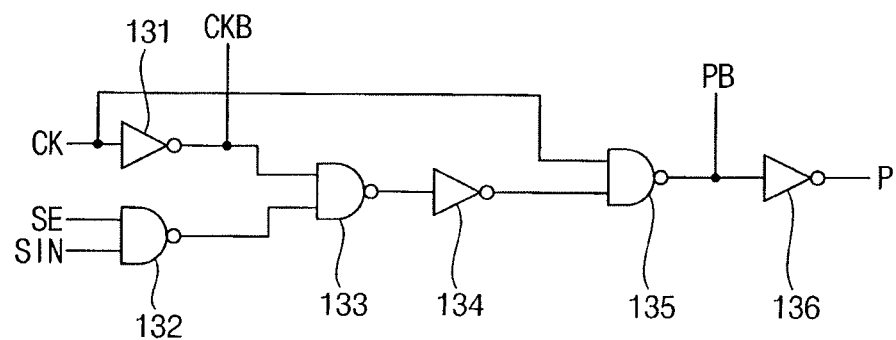

FIGS. 4A, 4B, and 4C illustrate circuit diagrams of exemplary embodiments of the pulse generator 100 in FIG. 1. More particularly, e.g., a pulse generator 110 of FIG. 4A, a pulse generator 120 of FIG. 4B, or a pulse generator 130 of FIG. 4C may be employed as the pulse generator 100 of FIG. 1.

Referring to FIG. 4A, in one or more embodiments, the pulse generator 110 may include an inverter 111, a delay unit 114, NAND gates 112, 113 and OR gate 117. The delay unit 114 may include inverters 115 and 116. The inverter 111 may receive and invert the clock signal CK, and provide an inverted clock signal CKB. The NAND gate 112 may perform a NAND operation on the scan enable signal SE and an inverted scan input signal SIN. The NAND gate 113 may perform a NAND operation on the outputs of the inverter 111 and the NAND gate 112. The delay unit 114 may delay an output of the NAND gate 113. The NOR gate 117 may perform an OR operation on the output (the inverted clock signal CKB) of the inverter 111 and an output of the delay unit 114 and may provide the pulse signal P.

Referring to FIG. 4B, in one or more embodiments, the pulse generator 120 may include inverters 121, 124, 126 and NAND gates 122, 123, 125, 127. The inverter 121 may invert the clock signal CK. The NAND gate 122 may perform a NAND operation on the scan enable signal SE and the inverted scan input signal SIN, i.e., the inverted scan input signal SI. The NAND gate 123 may perform a NAND operation on the output of the inverter 121 and an output of the NAND gate 122. The inverter 124 may invert an output of the NAND gate 123. The NAND gate 125 may perform a NAND operation on the clock signal CK and an output of the inverter 124. The inverter 126 may invert an output of the NAND gate 125 and may provide the pulse signal P. The NAND gate 127 may perform a NAND operation on the output of the inverter 121 and the output of the NAND gate 125 and may provide the delayed clock signal CKD.

Referring to FIG. 4C, in one or more embodiments, the pulse generator 130 may include inverters 131, 134, 136 and NAND gates 132, 133, 136. The inverter 131 may invert the clock signal CK and may provide the inverted clock signal CKB. The NAND gate 132 may perform a NAND operation on the scan enable signal SE and the inverted scan input signal SIN. The NAND gate 133 may perform a NAND operation on the output of the inverter 131 and an output of the NAND gate 132. The inverter 134 may invert an output of the NAND gate 133. The NAND gate 135 may perform a NAND operation on the clock signal CK and an output of the inverter 134 and may provide an inverted pulse signal PB. The inverter 136 may invert an output of the NAND gate 135 and may provide the pulse signal P.

Figure 5A:
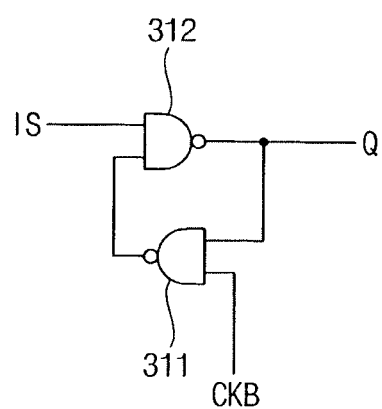
FIGS. 5A to 5C illustrate circuit diagrams of exemplary embodiments of the latch output unit of FIG. 1.
Figure 5B:
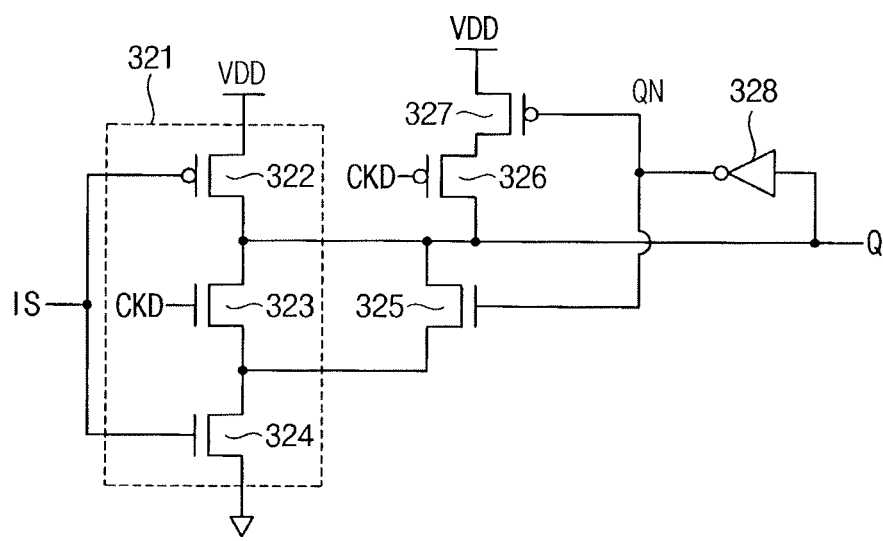
Figure 5C:
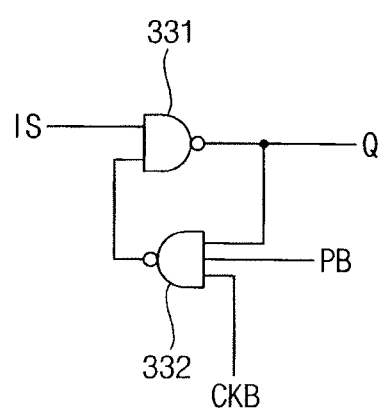

FIGS. 5A, 5B, and 5C illustrate circuit diagrams of exemplary embodiments of the latch output unit 300 of FIG. 1. More particularly, e.g., a latch output unit 310 of FIG. 5A, a latch output unit 320 of FIG. 5B, or a latch output unit 330 of FIG. 5C may be employed as the latch output unit 300 of FIG. 1

Referring to FIG. 5A, in one or more embodiments, the latch output unit 310 may include NAND gates 311, 312. The NAND gate 311 may perform a NAND operation on the output data Q and the inverted clock signal CKB. The NAND gate 312 may perform a NAND operation on the internal signal IS and an output of the NAND gate 311 and may provide the output data Q. The NAND gates 311, 312 may be back-to-back connected to each other and may prevent a signal fighting from occurring in the latch output unit 310. The delay clock signal CKB may prevent the output of the NAND gate 311 from being interfered with by a state of the output data Q, and the state of the output data Q may be subject to interference when the internal signal IS transitions.

Referring still to FIG. 5A, in one or more embodiments, by employing NAND gates, power consumption due to frequent toggling may be reduced.

For example, in the exemplary embodiment of FIG. 5A, when the output data Q is a logic high level and the inverted clock signal CKB transitions to a logic low level (that is, the clock signal CK transitions to a logic high level), the output of the NAND gate 311 transitions to a logic high level according to the inverted clock signal CKB. At this time, when the output data Q transitions to a logic low level, the output of the NAND gate 311 is already logic high level, and thus, the output of the NAND gate 311 does not toggle. Therefore, the output of the NAND gate 311 toggles according to the output data Q. Thus, in one or more embodiments, power consumption may be reduced and/or minimized, e.g., relative to a case in which the output of the NAND gate 311 toggles whenever the clock signal CK transitions.

Referring to FIG. 5B, in one or more embodiments, the latch output unit 320 may include a clock-based inverter 321, a NMOS transistor 325, PMOS transistors 326, 327, and an inverter 328. The clock-based inverter 321 may include a PMOS transistor 322 and NMOS transistors 323, 324 that are connected in series between the power supply voltage VDD and a ground voltage. The PMOS transistor 322 may include a gate receiving the internal signal IS. The NMOS transistor 324 may include a gate receiving the internal signal IS. The NMOS transistor 323 may include a gate receiving the delayed clock signal CKD. Therefore, the clock-based inverter 321 may maintain a state of the output data Q or may invert the internal signal IS to provide the output data Q according to a logic level of the delayed clock signal CKD.

For example, in the exemplary embodiment of FIG. 5B, when the delayed clock signal CKD is in the first phase (logic low level), the clock-based inverter 321 may maintain the state of the output data Q without regard to the delayed clock signal CKD. For example, when the delayed clock signal CKD is in the second phase (logic high level), the clock-based inverter 321 inverts the internal signal IS to provide the output data Q.

Referring still to FIG. 5B, the NMOS transistor 325 may be connected to an output node where the output data Q is provided and a connecting node where the NMOS transistors 323 and 324 are connected to each other. The NMOS transistor 325 may be connected in parallel with the NMOS transistor 323. The NMOS transistor 325 may include a gate receiving an inverted output data QN. The PMOS transistors 327, 326 may be connected, e.g., in series, between the power supply voltage VDD and the output node. The PMOS transistor 327 may include a gate receiving the inverted output data QN. The PMOS transistor 326 may include a gate receiving the delayed clock signal CKD. The inverter 328 may invert the output data Q and may provide the inverted output data ON. The NMOS transistor 325, the PMOS transistors 326, 327, and the inverter 328 may operate as a latch. Similar to the NAND gates 311, 312 of FIG. 5A, the NMOS transistor 325, the PMOS transistors 326, 327, and the inverter 328 of FIG. 5B may prevent signal fighting at the output node where the output data Q may be provided.

Referring to FIG. 5C, in one or more embodiments, the latch output unit 330 may include NAND gates 331, 332. The NAND gate 332 may perform a NAND operation on the output data Q, the inverted clock signal CKB and the inverted pulse signal P. The NAND gate 331 may perform a NAND operation on the internal signal IS and an output of the NAND gate 332 and may provide the output data Q. The NAND gates 331, 332 may be back-to-back connected to each other. Similar to the NAND gates 311, 312 of FIG. 5A discussed above, the NAND gates 331, 332 may prevent a signal fighting which may occur at the output node. In addition, the NAND gates 331, 332 may enable power consumption due to frequent toggling to be reduced and/or minimized.

More particularly, e.g., referring to FIGS. 1, 4A, and 5A, in one or more embodiments, the scan flip-flop circuit 10 may employ the pulse generator 110 of FIG. 4A and the latch output unit 310 of FIG. 5A as the pulse generator 100 and the latch output unit 300 of FIG. 1, respectively. In such embodiments, the clock signal CK may be applied to the dynamic input unit 200.

Referring to FIGS. 1, 4B, and 5B, in one or more embodiments, the scan flip-flop circuit 10 may employ the pulse generator 120 of FIG. 4B and the latch output unit 320 of FIG. 5B as the pulse generator 100 and the latch output unit 300 of FIG. 1, respectively. In such embodiments, the delayed clock signal CKD may be applied to the dynamic input unit 200.

Referring to FIGS. 1, 4C, and 5C, in one or more embodiments, the scan flip-flop circuit 10 may employ the pulse generator 130 of FIG. 4C and the latch output unit 330 of FIG. 5C as the pulse generator 100 and the latch output unit 300 of FIG. 1, respectively. In such embodiments, the clock signal CK may be applied to the dynamic input unit 200, and the inverted clock signal CKB and the inverted pulse signal PB may be applied to the latch output unit 300.

Hereinafter, there will be description about operation of the scan flip-flop circuit 10 according to example embodiments.

Figure 6:
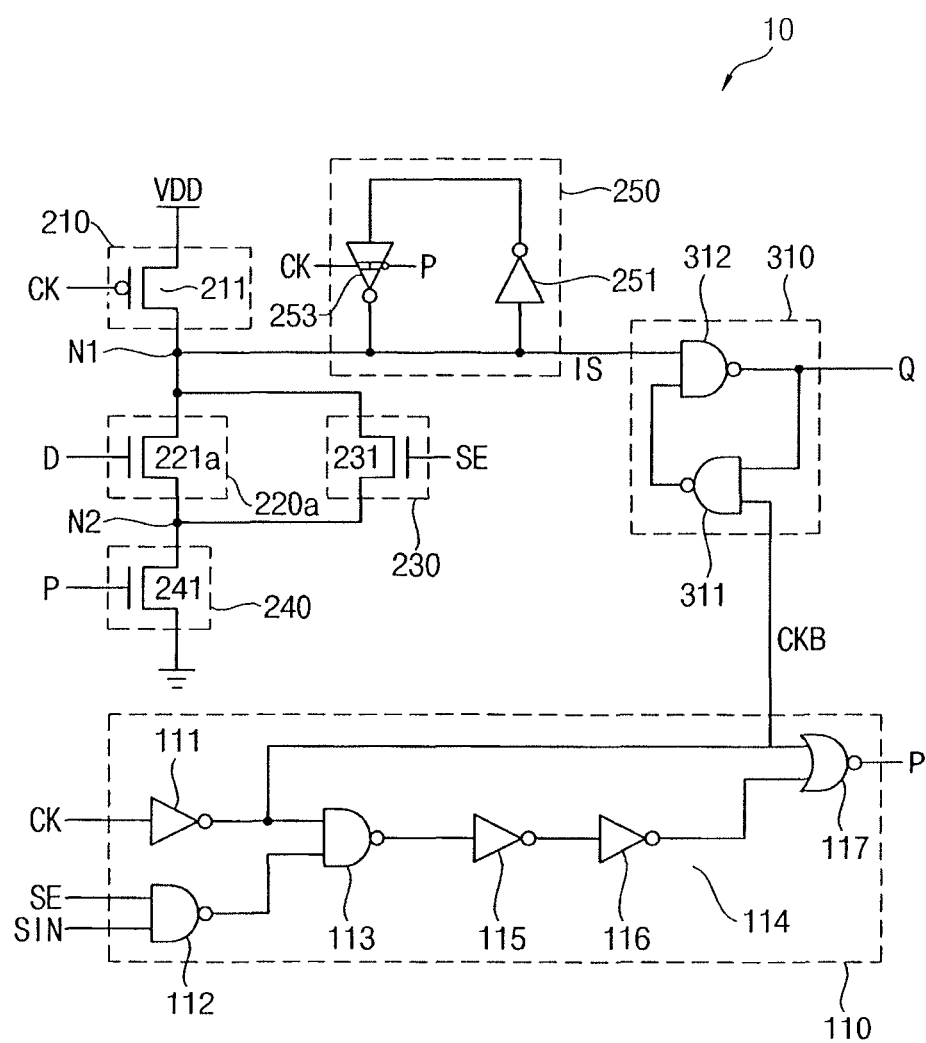
FIG. 6 illustrates a circuit diagram of an exemplary embodiment of the scan flip-flop circuit of FIG. 1 employing the data input unit of FIG. 3A, the clock generator of FIG. 4A and the latch output unit of FIG. 5A.

FIG. 6 illustrates a circuit diagram of an exemplary embodiment of the scan flip-flop circuit 10 employing the pulse generator 110 of FIG. 4A, the latch output unit 310 of FIG. 5A, and the exemplary embodiment of the dynamic input unit 200 of FIG. 2 including the exemplary embodiment of the data input unit 220a of FIG. 3A.

Figure 7:
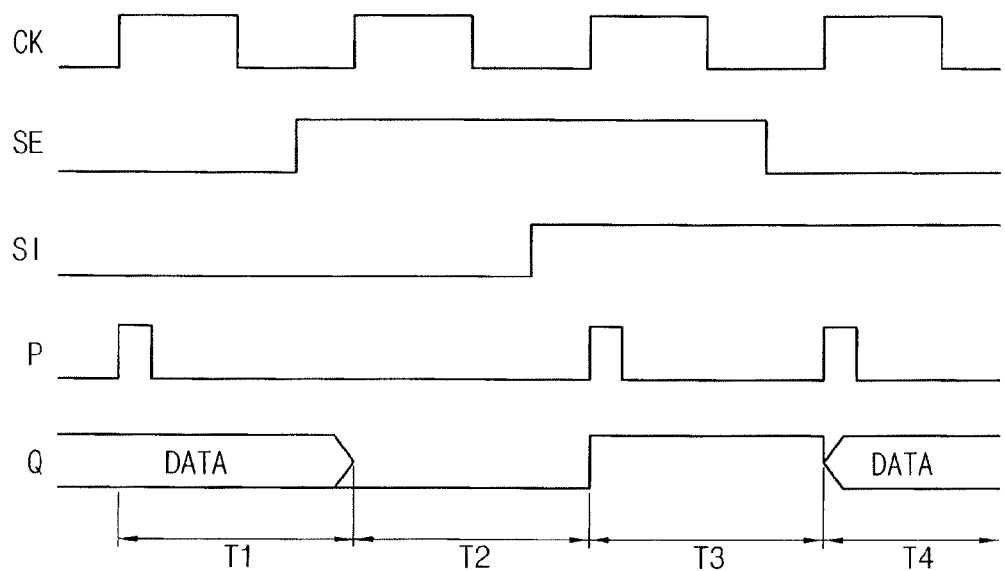
FIG. 7 illustrates a timing diagram of an exemplary operation of the scan flip-flop circuit of FIG. 6.

FIG. 7 illustrates a timing diagram of exemplary operation of the scan flip-flop circuit 10 of FIG. 6.

Referring to FIGS. 6 and 7, before an interval T1, when the clock signal CK is at the first phase (logic low level) and the scan enable signal SE is at a logic low level (the scan enable signal SE indicates the normal mode), the output data Q may follow the input data DATA.

During the interval T1, while the scan enable signal SE is a logic low level and the clock signal CK is in the second phase (logic high level), the PMOS transistor 211 is turned off and the NMOS transistor 231 is turned off. During the interval T1, when the scan enable signal SE is a logic low level and the clock signal CK is in the first phase (logic low level) again, the PMOS transistor 211 is turned on and the NMOS transistor 231 is still turned off. Accordingly, the pulse signal P may be enabled in synchronization with a rising edge of the clock signal CK in the normal mode, and the output data Q may change according to the input data DATA. When the scan enable signal SE transitions to a logic high level (the scan mode), the NMOS transistor 231 is turned on. The logic level of the pulse signal P is determined based on the scan input signal SI without regard to the clock signal CK. That is, the pulse signal P is a logic low level, without regard to the clock signal CK, when the scan input signal SI is a logic low level in the scan mode.

During an interval T2, when the clock signal CK is in the second phase (logic high level), the scan enable signal SE is a logic high level and the scan input signal SI is a logic low level, the pulse signal P is a logic low level. Accordingly, the PMOS transistor 211 is turned off and the NMOS transistor 231 is turned on, and thus, a conducting path is formed between the first and second nodes N1 and N2. In addition, the NMOS transistor 241 is turned off, and thus, the internal signal IS is a logic high level. Accordingly, the output data Q is a logic low level. When the clock signal CK transitions to the first phase, and the scan input signal SI transitions to a logic high level, the internal signal SI is maintained at a logic high level, thereby maintaining the output data Q at a logic low level.

During an interval T3, when the clock signal CK transitions to the second phase, the pulse signal P transitions to a logic high level. Accordingly, the NMOS transistor 241 is turned on, and thus, the first node Ni is discharged to a ground voltage through the second node N2. Therefore, the internal signal IS transitions to a logic low level, and thus, the output data Q transitions to a logic high level in synchronization with the clock signal CK. Even when the pulse signal P transitions to a logic low level, the output data Q is maintained at a logic high level because the PMOS transistor 211 is turned off.

Even when the clock signal CK transitions to a logic low level, the output data Q is maintained at a logic high level because the inverted clock signal CKB transitions to a logic high level, thereby forcing the output of the NAND gate 311 to a logic low level.

During an interval T4, the scan enable signal SE is a logic low level. During the interval T4, operation is substantially the same as during the interval Ti.

The pulse signal P applied to the NMOS transistor 241 indicates information of the scan input signal SI in the scan mode, and thus, the output data Q indicates information of the scan input signal SI in the scan mode according to some example embodiments. In addition, because the scan input signal SI has substantially same hold time as the scan enable signal SE, the hold time of the scan input signal SI may be reduced. Accordingly, the occupied size may be reduced, scan function may be realized without additional transistors, and an output time of the signal may be increased.

Although FIG. 7 is described with reference to FIG. 6, the exemplary signal waveforms of FIG. 7 may be similarly employed for the operation of an exemplary embodiment in which the pulse generator 120 of FIG. 4B and the latch output unit 320 of FIG. 5B are employed as the pulse generator 100 and the latch output unit 300 of FIG. 1, respectively, or in an exemplary embodiment in which the pulse generator 130 of FIG. 4C and the latch output unit 330 of FIG. 5C are employed as the pulse generator 100 and the latch output unit 300 of FIG. 1, respectively.

Figure 8A:
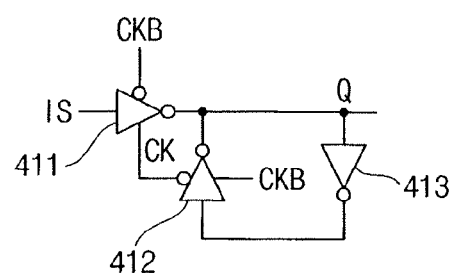
FIGS. 8A to 8C illustrate circuit diagrams of exemplary embodiments of the latch output unit of FIG. 1.
Figure 8B:
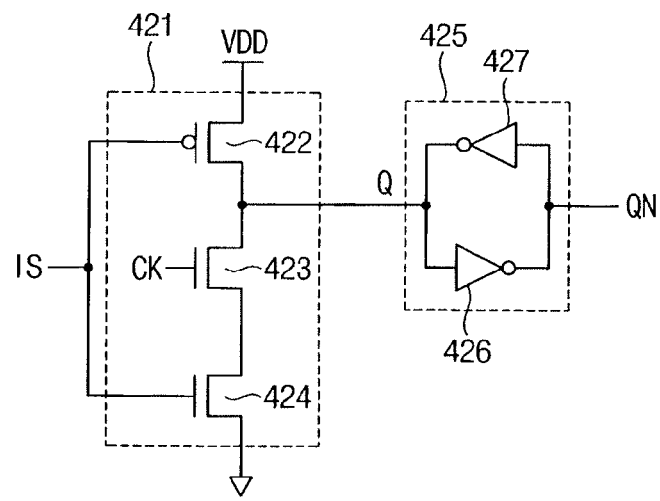
Figure 8C:
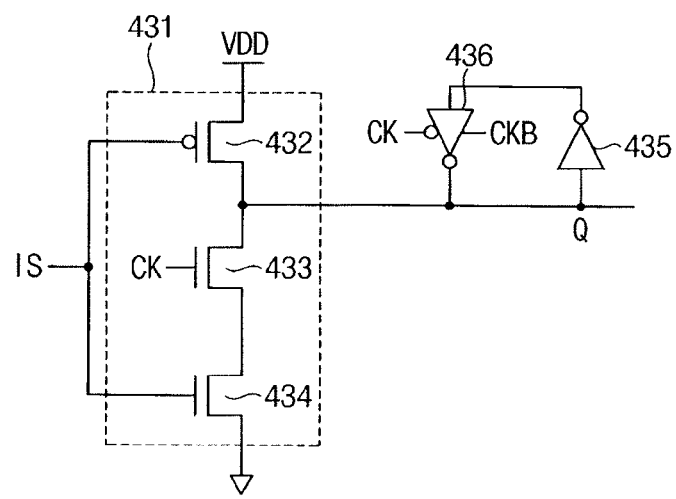

FIGS. 8A, 8B, and 8C illustrate circuit diagrams of exemplary embodiments of the latch output unit 300 of FIG. 1. More particularly, e.g., a latch output unit 410 of FIG. 8A, a latch output unit 420 of FIG. 8B, or a latch output unit 430 of FIG. 8C may be employed as the latch output unit 300 of FIG. 1. The latch output units 410, 420 and 430 may operate substantially same as the latch output units 310, 320 and 330.

Referring to FIG. 8A, the latch output unit 410 may include tri-state inverters 411, 412, and an inverter 413. More particularly, e.g., referring to FIGS. 1, 2, and 8A, the tri-state inverter 411 may be connected between the first node N1, e.g., the node receiving the input signal IS from the dynamic input unit 200, and the output node, e.g., the node outputting the output data Q. The tri-state inverter 411 may invert the internal signal IS in response to the inverted clock signal CKB and the clock signal CK. The inverter 413 may invert the output data Q to be provided to the tri-state inverter 412. The tri-state inverter 412 may be connected between an output terminal of the inverter 413 and the output node. The tri-state inverter 412 may invert an output of the inverter 413 in response to the clock signal CK and the inverted clock signal CKB.

Referring to FIG. 8B, the latch output unit 420 may include a clock-based inverter 421 and a latch unit 425. The clock-based inverter 421 may include PMOS transistor 422 and NMOS transistor 423, 424 that may be connected in series between the power supply voltage VDD and the ground voltage. The PMOS transistor 422 may include a gate receiving the internal signal IS, and the NMOS transistor 424 may include a gate receiving the internal signal IS. The NMOS transistor 423 may include a gate receiving the clock signal CK. The clock-based inverter 421 may selectively invert the internal signal IS to provide the output data Q in response to the clock signal CK. The latch unit 425 may include inverters 426 and 427, which may be back-to-back connected. The latch unit 425 may invert the output data Q and may provide the inverted output data QN.

Referring to FIG. 8C, the latch output unit 430 may include a clock-based inverter 431, an inverter 435 and a tri-state inverter 436. The clock-based inverter 431 may include PMOS transistor 432 and NMOS transistors 433, 434 that may be connected in series between the power supply voltage VDD and the ground voltage. The PMOS transistor 432 may include a gate receiving the internal signal IS. The NMOS transistor 434 may include a gate receiving the internal signal IS. The NMOS transistor 433 may include a gate receiving the clock signal CK. The clock-based inverter 431 may selectively invert the internal signal IS and may provide the output data Q in response to the clock signal CK. The inverter 435 may invert the output data Q to be provided to the tri-state inverter 436. The tri-state inverter 436 may be connected between an output terminal of the inverter 435 and the output node. The tri-state inverter 436 may invert an output of the inverter 435 in response to the clock signal CK and the inverted clock signal CKB.

Embodiments of a flip-flop circuit including one or more features described above may compensate for a voltage drop due to a parasitic capacitance by injecting charges. Therefore, embodiments of a flip-flop circuit including one or more features described herein may be applicable to computer systems that require high speed and/or noise immunity.

Figure 9:
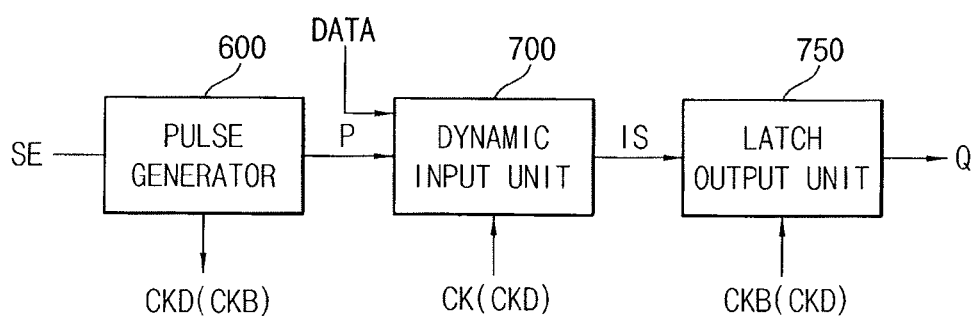
FIG. 9 illustrates a block diagram of an exemplary embodiment of a flip-flop circuit.

FIG. 9 illustrates a block diagram of another exemplary embodiment of flip-flop circuit 500.

Referring to FIG. 9, the flip-flop circuit 500 may include a pulse generator 600, a dynamic input unit 700, and a latch output unit 750. In general, only differences between the exemplary flip-flop circuit 500 of FIG. 9 and the exemplary flip-flop circuit 10 of FIG. 1 will be described below.

The pulse generator 600 may generate a pulse signal P that is synchronized with a rising edge of the clock signal CK with a delay and has an activation interval shorter than the clock signal CK, based on the clock signal CK. The dynamic input unit 700 may precharge an evaluation node NE (Refer to FIG. 11) to a power supply voltage VDD in a first phase of the clock signal CK, and may selectively discharge the evaluation node NE in response to input data DATA and the pulse signal P in a second phase of the clock signal CK. The latch output unit 750 may latch an internal signal IS provided from the evaluation node NE and may provide the output data Q. The latch output unit 750 may determine a present state of the output data Q based on a logic level of the clock signal CK and a previous state of the output data Q.

The delayed clock signal CKD (i.e., a signal corresponding to the clock signal CK, but delayed, and in cases in which the delay corresponds to a half cycle of the clock signal CK, the delayed clock signal CKD may correspond to an inverse clock signal CKB) may be applied to the dynamic input unit 700 in FIG. 1 instead of the clock signal CK. When the delayed clock signal CKD is applied to the dynamic input unit 700 instead of the clock signal CK, the delayed clock signal CKD may also be applied to the latch output unit 750 instead of the clock signal CK. In various exemplary embodiments, when there is a description on the clock signal CK applied to the dynamic input unit 700 and the latch output unit 750, the description may include a case of the delayed clock signal CKD being applied to the dynamic input unit 700 and the latch output unit 750 and vice versa.

Figure 10A:
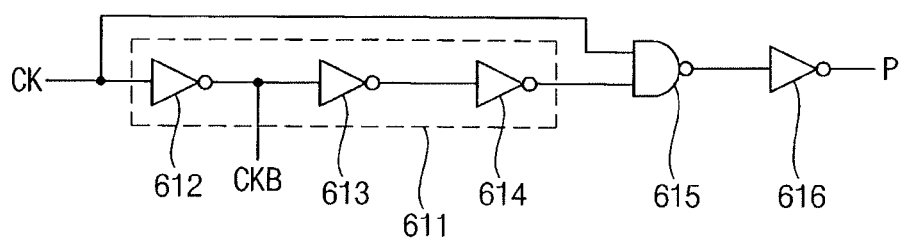
FIGS. 10A to 10C illustrate circuit diagrams of exemplary embodiments of the pulse generator of FIG. 9.
Figure 10B:
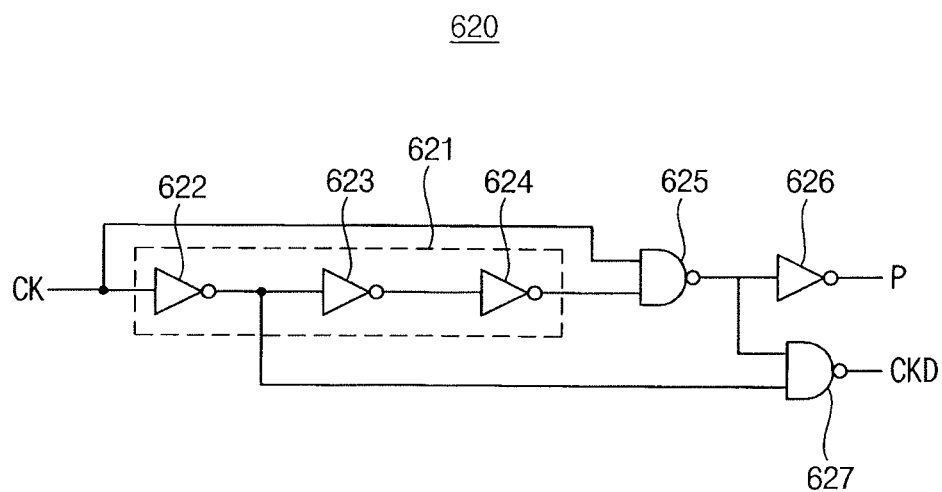
Figure 10C:
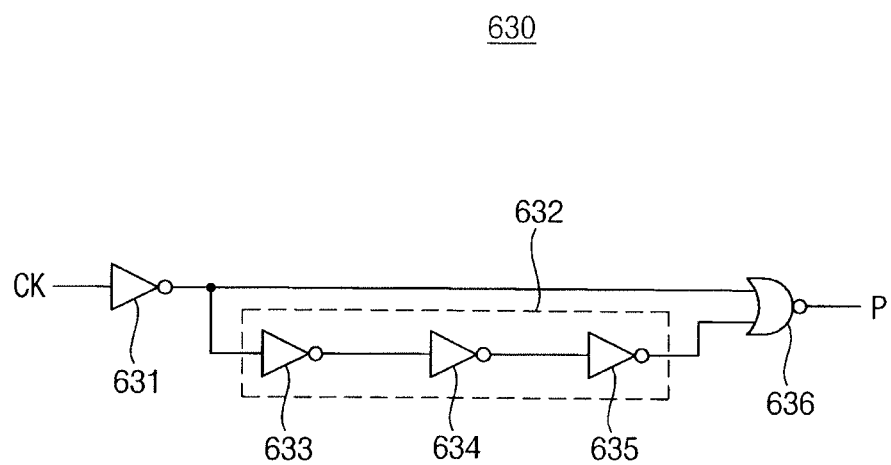

FIGS. 10A, 10B, and 10C illustrate circuit diagrams of exemplary embodiments of the pulse generator 600 in FIG. 9. More particularly, e.g., a pulse generator 610 of FIG. 10A, a pulse generator 620 of FIG. 10B, or a pulse generator 630 of FIG. 10C may be employed as the pulse generator 600 of FIG. 9.

Figure 13:
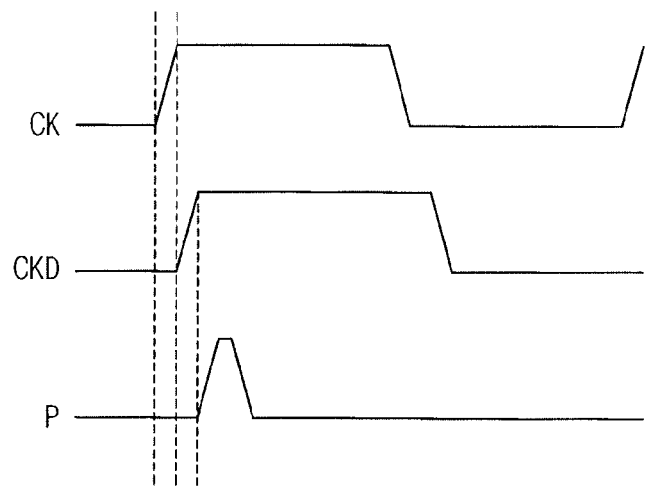
FIG. 13 illustrates a timing diagram of an exemplary clock signal, an exemplary inverted clock signal and an exemplary pulse signal employable to drive the flip-flop circuit of FIG. 12.

Referring to FIG. 10A, the pulse generator 610 may include a delay unit 611, a NAND gate 615 and an inverter 616. The delay unit 611 may include inverters 612, 613, 614, which may be connected in series. The delay unit 611 may delay and invert the clock signal CK. The NAND gate 615 may perform a NAND operation on the clock signal CK and an output of the delay unit 611. The inverter 616 may invert an output of the NAND gate 615 and may provide the pulse signal P. Accordingly, the pulse signal P may be synchronized with a rising edge of the clock signal CK with a delay and may have an activation interval shorter than the clock signal CK, as is illustrated in FIG. 13. An output of the inverter 612 may be used as an inverted clock signal CKB.

Referring to FIG. 10B, the pulse generator 620 may include a delay unit 621, a NAND gate 625, an inverter 616, and a NAND gate 627. The delay unit 621 may include inverters 622, 623, 624, which may be connected in series. The delay unit 621 may delay and invert the clock signal CK. The NAND gate 625 may perform a NAND operation on the clock signal CK and an output of the delay unit 621. The inverter 626 may invert an output of the NAND gate 625 and may provide the pulse signal P. The NAND gate 627 may perform a NAND operation on an output of the inverter 622 and the output of the NAND gate 625 and may provide a delay clock signal CKD. Accordingly, the pulse signal P may be synchronized with a rising edge of the clock signal CK with a delay and may have an activation interval shorter than the clock signal CK and/or the delayed clock signal CKD, as is illustrated in FIG. 13. In addition, the delayed clock signal CKD may have a delay with respect to the clock signal CK. The delay of the delayed clock signal CKD may be substantially the same delay as the delay of the pulse signal P has with respect to the clock signal CK and/or with respect to the delayed clock signal CKD. The delayed clock signal CKD may have same activation interval as the clock signal CK.

Referring to FIG. 10C, the pulse generator 630 may include an inverter 631, a delay unit 632 and an exclusive OR gate 636. The delay unit 632 may include inverters 633, 634 and 635, which may be connected in series. The inverter may invert the clock signal CK. The delay unit 632 may delay and invert an output of the inverter 631. The exclusive OR gate 636 may perform an exclusive OR operation on the output of the inverter 631 and an output of the delay unit 632 and may provide the pulse signal P. Accordingly, the pulse signal P may be synchronized with a rising edge of the clock signal CK with a delay and has an activation interval shorter than the clock signal CK and/or the delayed clock signal CKD, as is illustrated in FIG. 13.

Figure 11:
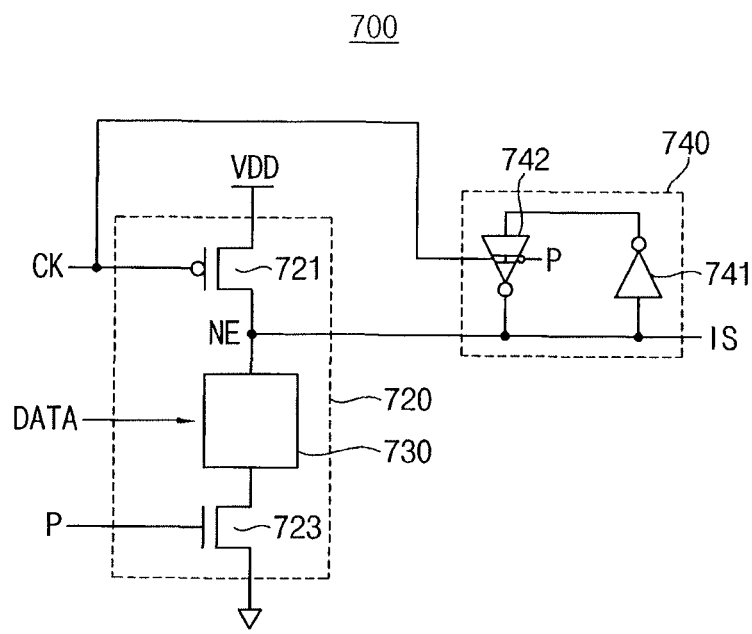
FIG. 11 illustrates a circuit diagram of an exemplary embodiment of the dynamic input unit of FIG. 9.

FIG. 11 illustrates a circuit diagram of another exemplary embodiment of the dynamic input unit 700 of FIG. 9. Referring to FIG. 11, a dynamic input unit 700 may include an evaluation unit 720. The dynamic input unit 700 may further include a latch unit 740. The evaluation unit 720 may include a PMOS transistor 721 that may be connected between a power supply voltage VDD and the evaluation node NE. The PMOS transistor 721 may include a gate receiving the clock signal CK, a data input unit 730, and a NMOS transistor 723. The data input unit 730 may be connected to the evaluation node NE. The data input unit 730 may receive the input data DATA. The NMOS transistor 723 may be connected between the data input unit 730 and the ground voltage. The NMOS transistor 723 may include a gate receiving the pulse signal P. The latch unit 740 may latch the internal signal IS provided from the evaluation node NE. The latch unit 740 may include an inverter 741 and a tri-state inverter 742, which may be back-to-back connected. The tri-state inverter 742 may receive the clock signal CK and the pulse signal P as control signals.

The data input unit 730 may employ one of the data input units 220a, 220b 220c and 220d of FIGS. 3A to 3D.

The latch output unit 750 in FIG. 9 may employ one of the latch output units 310, 320 and 330 of FIGS. 5A to 5C or the latch output units 410, 420 and 430 of FIGS. 8A to 8C.

Figure 12:
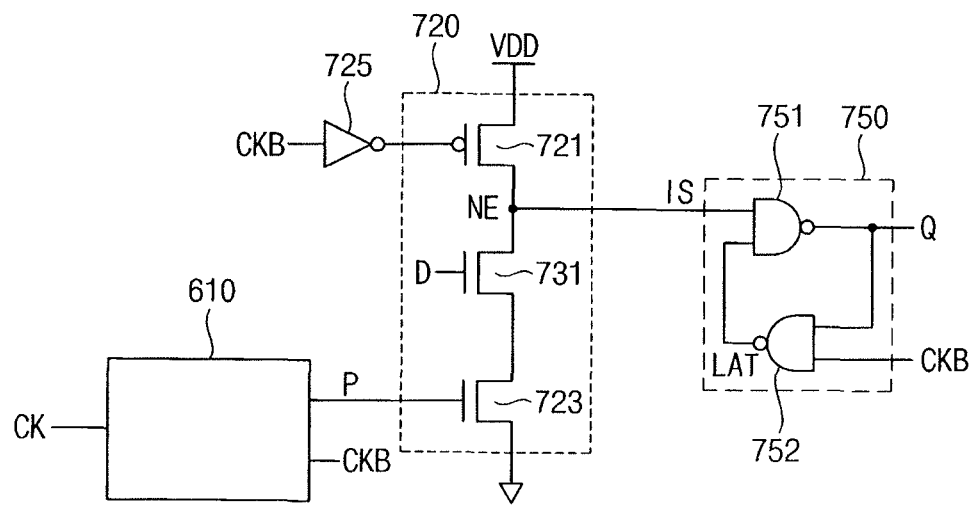
FIG. 12 illustrates a circuit diagram of an exemplary embodiment of the flip-flop circuit of FIG. 9 employing the data input unit of FIG. 3A, and the latch output unit of FIG. 5A.

FIG. 12 illustrates a circuit diagram of an exemplary embodiment of the flip-flop circuit 500 of FIG. 9 employing the data input unit 220a of FIG. 3A, and the latch output unit 310 of FIG. 5A. FIG. 13 illustrates a timing diagram of an exemplary clock signal, an exemplary inverted clock signal and an exemplary pulse signal employable to drive the flip-flop circuit of FIG. 12.

Hereinafter, exemplary operation of the flip-flop circuit 500 will be described reference to FIGS. 12 and 13. In FIG. 12, the inverter 725 may delay the inverted clock signal CKB and may provide an output thereof to the PMOS transistor 721. That is, the delayed clock signal CKD may be provided to a gate of the PMOS transistor 721.

When the clock signal CK is in the first phase (logic low level), each of the delayed clock signal CKD and the pulse signal P may be a logic low level. Accordingly, the PMOS transistor 721 is turned on, and the NMOS transistor 723 is turned off. Therefore, the evaluation node NE may be precharged to a level of the power supply voltage VDD. When the clock signal CK transitions to the second phase (logic high level), each of the delayed clock signal CKD and the pulse signal P transitions to a logic high level with a delay. When the pulse signal P is a logic high level, the NMOS transistor 723 is turned on, and thus, the evaluation node NE may be discharged or maintained at a previous state according to evaluation of the input data D.

For example, when the input data D is a logic low level (digital "0"), the evaluation node NE may be maintained at a logic high level because the NMOS transistor 731 is turned off. In such embodiments, an output LAT of the NAND gate 752 may have a logic level depending on the previous state of the output data Q, because the NAND gate 752 may receive the inverted clock signal CKB and the output data Q. When the previous state of the output data Q is a logic high level, the output LAT of the NAND gate 752 transitions to a logic high level, thereby causing the output data Q to transition to a logic low level. When the previous state of the output data Q is a logic low level, the output LAT of the NAND gate 752 is maintained at a logic high level, thereby causing the output data Q to be maintained at a logic low level. Accordingly, the output data Q may be maintained at logic low level because the output LAT of the NAND gate 752 does not toggle, when the previous state of the output data Q is a logic low level.

For example, when the input data D is a logic high level (digital "1"), the evaluation node NE may be discharged to the ground level because the NMOS transistor 731 is turned on. In such embodiments, the output LAT of the NAND gate 752 may have a logic level depending on the previous state of the output data Q, because the NAND gate 752 may receive the inverted clock signal CKB and the output data Q. When the previous state of the output data Q is a logic high level, the output LAT of the NAND gate 752 transitions to a logic high level, thereby causing the output data Q to be maintained at a logic low level. When the previous state of the output data Q is a logic low level, the output LAT of the NAND gate 752 is maintained at a logic high level, thereby causing the output data Q to transition to a logic high level. Accordingly, output LAT of the NAND gate 752 does not toggle, when the previous state of the output data Q is a logic high level.

FIGS. 14A to 14D illustrate graphs of an exemplary operation of the flip-flop circuit of FIG. 9.

Figure 14A:
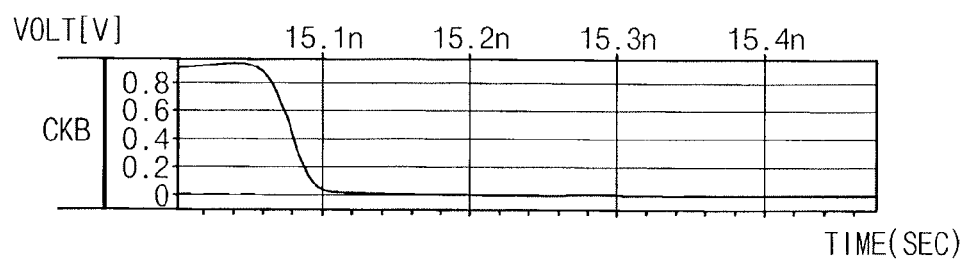
FIGS. 14A to 14D illustrate graphs of power consumption of the exemplary flip-flop circuit of FIG. 9.

FIG. 14A illustrates a graph of the inverted clock signal CKB transitioning to a logic low level.

Figure 14B:
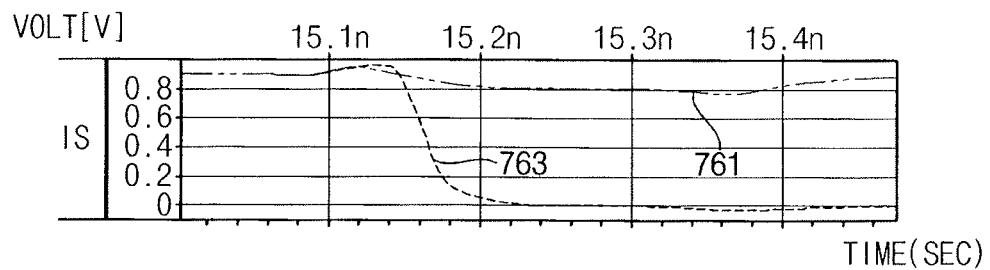

FIG. 14B illustrates a graph of the internal signal IS in response to the input data D when the inverted clock signal CKB transitions to a logic low level. In FIG. 14B, a reference numeral 761 represents a case that the input data D is a logic low level, and a reference numeral 763 represents a case that the input data D is a logic high level.

Figure 14C:
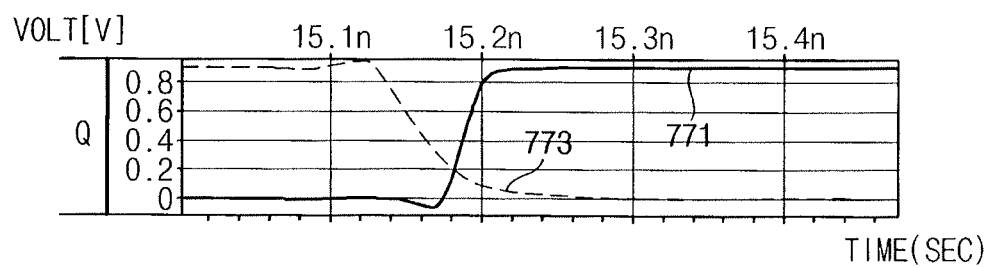

FIG. 14C illustrates a graph of the output data Q in response to the input data D when the inverted clock signal CKB transitions to a logic low level. In FIG. 14C, a reference numeral 771 represents a case that the input data D is a logic high level, and a reference numeral 773 represents a case that the input data D is a logic low level.

Figure 14D:
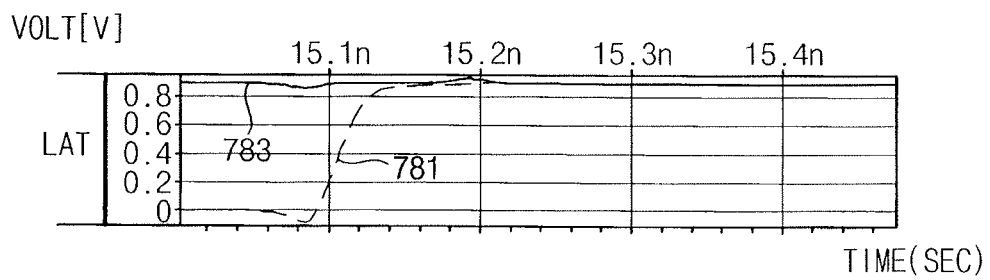

FIG. 14D illustrates a graph of the output LAT of the NAND gate 752 in response to the previous state of the output data Q when the input data D is a logic low level. In FIG. 14D, a reference numeral 781 represents a case that the previous state of the output data Q is a logic high level, and a reference numeral 783 represents a case that the previous state of the output data Q is a logic low level.

Referring to FIGS. 14A to 14D, when the previous state of the output data Q is a logic high level, the output LAT of the NAND gate 752 transitions to a logic high level. Thus, the output data Q transitions to a logic low level. In addition, when the previous state of the output data Q is a logic low level, the output LAT of the NAND gate 752 is maintained at a logic high level. Thus, the output data Q is maintained at a logic low level. In one or more embodiments, when the previous state of the output data Q is a logic low level, the output data Q is maintained at a logic low level because the output LAT of the NAND gate 752 does not toggle.

Accordingly, the evaluation result of the input data may be quickly transferred to next stages, power consumption may be reduced and operating speed may be increased because of the toggling of the latch output unit being reduced due to the inverted clock signal CKB according to some example embodiments.

Figure 15A:
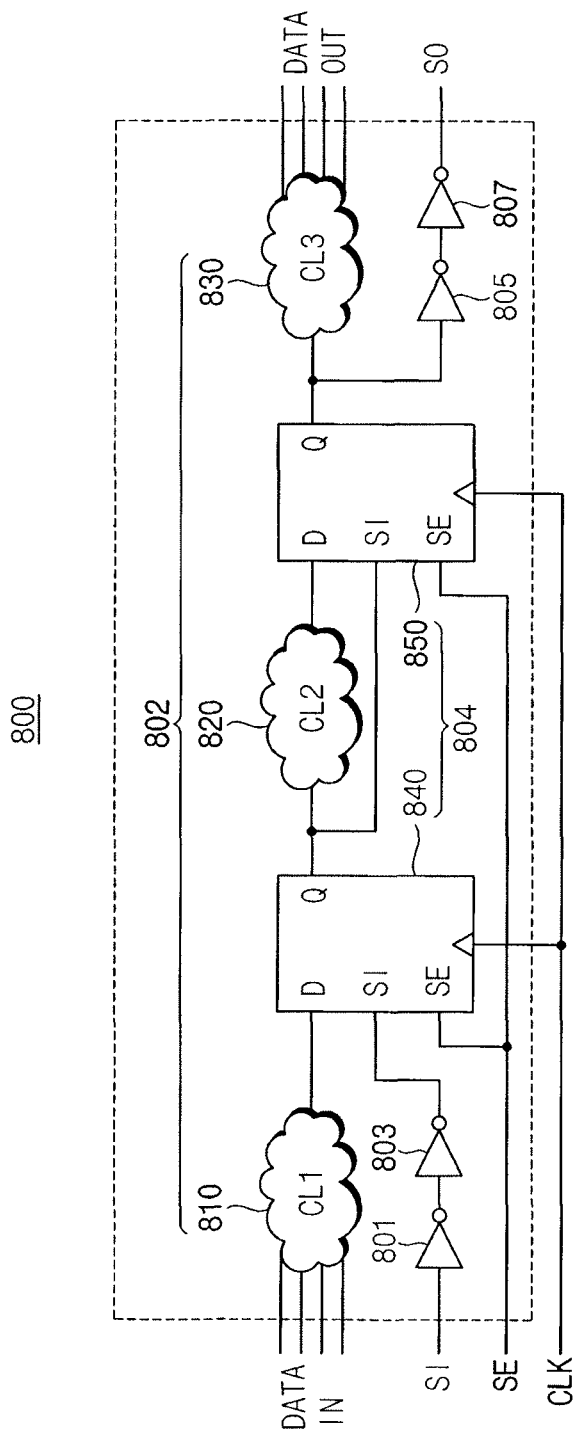
FIGS. 15A and 15B illustrate block diagrams of exemplary embodiments of scan test circuits.
Figure 15B:
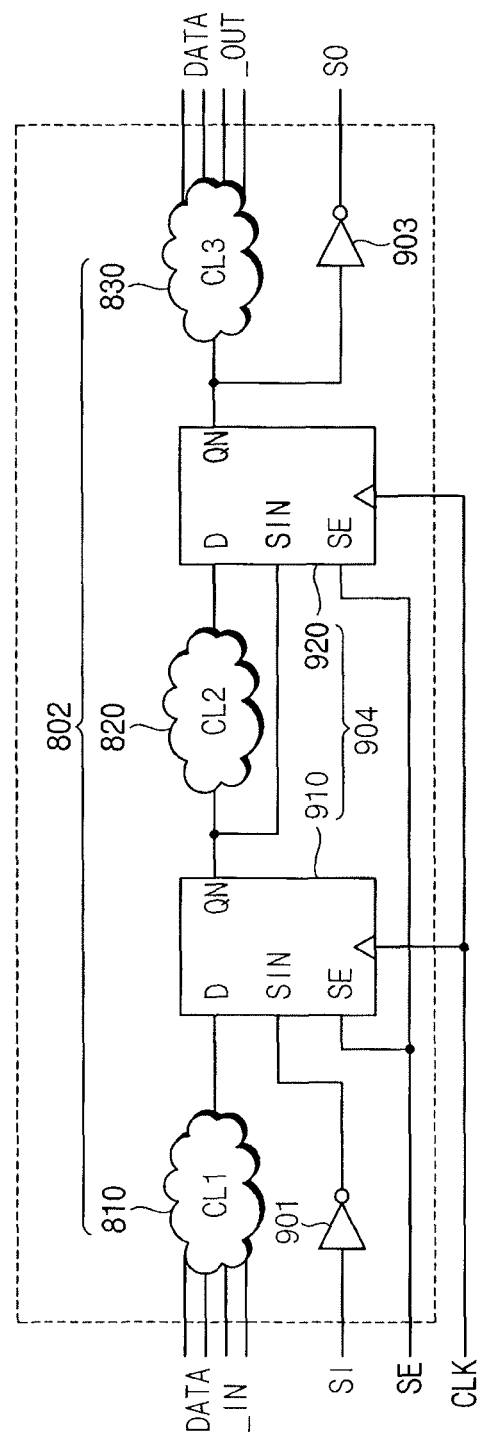

FIGS. 15A and 15B illustrate block diagrams of exemplary embodiments of scan test circuits.

FIG. 15A illustrates a scan test circuit employing a scan input signal SI, and FIG. 15B illustrates a scan test circuit employing an inverted scan input signal SIN.

Referring to FIG. 15A, a scan test circuit 800 may include a combinational logic circuit unit 802, a sequential logic circuit unit 804 and inverters 801, 803, 805 and 807. The combinational logic circuit unit 802 may include combinational logic circuits 810, 820 and 830. The sequential logic circuit unit 804 may include scan flip-flop circuits 840 and 850.

The combinational logic circuit 810 may operate on data DATA IN to be provided to the scan flip-flop circuit 840. The scan flip-flop circuit 840 may provide input data D as output data Q in a normal mode (when a scan enable signal SE is a logic low level), and may provide scan input signal SI as the output data Q in a scan mode (when the scan enable signal SE is a logic low level), in synchronization with a clock signal CK. The combinational logic circuit 820 may operate on the output Q of the scan flip-flop circuit 840 before being provided to the scan flip-flop circuit 850 as a scan input.

The scan flip-flop circuit 850 may receive the output Q of the scan flip-flop circuit 840 as the scan input. The scan flip-flop circuit 850 may also receive the scan enable signal SE and the clock signal CK. The combinational logic circuit 830 may operate on the output Q of the scan flip-flop circuit 850 before being provided as output data DATA_OUT. The output Q of the scan flip-flop 850 may be provided as scan output SO through inverters 805 and 807.

Referring to FIG. 15B, a scan test circuit 900 may include a combinational logic circuit unit 802, a sequential logic circuit unit 904 and inverters 901 and 903. The combinational logic circuit unit 802 may include combinational logic circuits 810, 820 and 830. The sequential logic circuit unit 904 may include scan flip-flop circuits 910 and 920. The scan test circuit 900 of FIG. 15B may differ from the scan test circuit 800 of FIG. 15A in that the scan flip-flop circuits 910 and 920 may receive the inverted scan input signal SIN, and may output the inverted output data QN. Therefore, detailed description on operation and structure of the scan flip-flop circuit 900 will be omitted.

The scan flip-flop circuits 840 and 850 in FIG. 15A, and the scan flip-flop circuits 910 and 920 may employ the scan flip-flop circuit 10 of FIG. 1 or the flip-clop circuit 400 of FIG. 400. Accordingly, the scan test circuit 800 of FIG. 15A and the scan test circuit 900 of FIG. 15B may operate on the input data DATA _IN to provide the output data DATA_OUT in the normal mode, and may provide the scan output SO according to the scan input signal SI in the scan mode. Accordingly, it may be easily determined whether the combinational logic circuits 810, 820 and 830 operate properly.

In one or more embodiments, the pulse signal P may provide information of the scan input signal SI in the scan mode. The output data Q may provide information of the scan input signal SI in the scan mode. One or more embodiments may enable an occupied size to be reduced, and scan function may be realized without additional transistors, and/or an output time of the signal may be increased. One or more embodiments may enable toggling to be reduced using the inverted clock signal. One or more embodiments may be applicable to a general processor.

The foregoing is illustrative of exemplary embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A scan flip-flop circuit, comprising:
   a pulse generator configured to generate a pulse signal that is enabled in synchronization with a rising edge of a clock signal in a normal mode, and is selectively enabled in synchronization with the rising edge of the clock signal in response to a logic level of a scan input signal in a scan mode;
   a dynamic input unit configured to precharge a first node to a power supply voltage in a first phase of the clock signal, configured to selectively discharge the first node based on input data in a second phase of the clock signal in the normal mode, and configured to discharge the first node in response to the scan signal in the scan mode; and
   a latch output unit configured to latch an internal signal provided from the first node to provide an output data, and configured to determine whether the output data is toggled based on at least a logic level of the clock signal and a previous state of the output data, wherein the pulse generator is configured to generate at least one pulse during a period of the scan mode in which the output data does not change based on the input data.

2. The scan flip-flop circuit as claimed in claim 1, wherein the pulse generator comprises:
a first inverter that inverts the clock signal;
a first NAND gate that performs a NAND operation on a scan enable signal and an inverted signal of the scan input signal, the scan enable signal indicating one of the normal mode and the scan mode;
a second NAND gate that performs a NAND operation on an output of the first NAND gate and an output of the first inverter;
a delay unit that delays an output of the second NAND gate, the delay unit including second and third inverters; and
a NOR gate that performs a NOR operation on the output of the first inverter and an output of the delay unit to provide the pulse signal.

3. The scan flip-flop circuit as claimed in claim 2, wherein the latch output unit comprises:
a third NAND gate that performs on a NAND operation on the output of the first inverter (an inverted clock signal) and the output data; and
a fourth NAND gate that performs on a NAND operation on the internal signal and an output of the third NAND gate to provide the output data.

4. The scan flip-flop circuit as claimed in claim 1, wherein the pulse generator comprises:
a first inverter that inverts the clock signal;
a first NAND gate that performs a NAND operation on a scan enable signal and an inverted signal of the scan input signal, the scan enable signal indicating one of the normal mode and the scan mode;
a second NAND gate that performs a NAND operation on an output of the first NAND gate and an output of the first inverter;
a second inverter that inverts an output of the second NAND gate;
a third NAND gate that performs a NAND operation on an output of the second inverter and the clock signal;
a third inverter that inverts an output of the third NAND gate to provide the pulse signal; and
a fourth NAND gate that performs a NAND operation on the output of the first inverter and the output of the third NAND gate to provide a delay clock signal which is delayed with respect to the clock signal.

5. The scan flip-flop circuit as claimed in claim 4, the latch output unit comprises:
a fourth inverter that inverts the output data;
first and second p-type metal oxide semiconductor (PMOS) transistors, cascade-connected between a power supply voltage and an output node, the first PMOS transistor having a gate receiving an output of the fourth inverter, the second PMOS transistor having a gate receiving the delayed clock signal, the output data being provided at the output node;
a third PMOS transistor, first and second n-type MOS (NMOS) transistors, cascade-connected between the power supply voltage and a ground voltage, the third PMOS transistor having a gate connected to the first node, the first NMOS transistor receiving the delayed clock signal and the second NMOS transistor having a gate connected to the first node; and
a third NMOS transistor, connected to the output node and a connecting node, having a gate receiving an output of the fourth inverter, the first and second NMOS transistors being connected to each other at the connecting node.

6. The scan flip-flop circuit as claimed in claim 1, wherein the pulse generator comprises:
a first inverter that inverts the clock signal;
a first NAND gate that performs a NAND operation on a scan enable signal and an inverted signal of the scan input signal, the scan enable signal indicating one of the normal mode and the scan mode;
a second NAND gate that performs a NAND operation on an output of the first NAND gate and an output of the first inverter;
a second inverter that inverts an output of the second NAND gate;
a third NAND gate that performs a NAND operation on an output of the second inverter and the clock signal; and
a third inverter that inverts an output of the third NAND gate to provide the pulse signal.

7. The scan flip-flop circuit as claimed in claim 6, wherein the latch output unit comprises:
a fourth NAND gate that performs on a NAND operation on the output of the first inverter (an inverted clock signal), the output of the third NAND gate and the output data; and
a fifth NAND gate that performs on a NAND operation on the internal, signal and an output of the fourth NAND gate to provide the output data.

8. The scan flip-flop circuit as claimed in claim 1, wherein the dynamic input unit comprises:
a precharging unit, connected to a power supply voltage, which precharges the first node to a level of the power supply voltage in response to the clock signal;
a data input unit, connected to the first node and a second node, which forms a first path between the first and second nodes in response to at least one input data in the normal mode;
a scan unit, connected to the first and second node in parallel with the data input unit, which forms a second path between the first and second nodes in the scan mode; and
a discharging unit, connected to the second node and a ground voltage, which discharges the second node in response to the pulse signal.

9. The scan flip-flop circuit as claimed in claim 8, wherein the dynamic input unit further comprises:
an inverter that inverts a logic level of the first node; and
a latch unit, connected to an output of the inverter and the first node, which has a tri-state inverter that selectively inverts the output of the inverter in response to the clock signal and the pulse signal.

10. The scan flip-flop circuit as claimed in claim 1, wherein the latch output unit comprises:
a first tri-state inverter, connected to the first node and an output node, which receives the clock signal and an inverted clock signal that the clock signal is inverted, the output data being provided at the output node;
an inverter that inverts the output data; and
a second tri-state inverter, connected to an output terminal of the inverter and the output node, which receives the clock signal and the inverted clock signal.

11. The scan flip-flop circuit as claimed in claim 1, wherein the latch output unit comprises:
a clock-based inverter which selectively inverts a logic level of the first node in response to the clock signal to provide the output data; and
a latch unit that latches the output data.

12. The scan flip-flop circuit as claimed in claim 1, wherein the latch output unit comprises:

a clock-based inverter which selectively inverts a logic level of the first node in response to the clock signal to provide the output data;

a inverter that inverts the output data; and a tri-state inverter, connected to an output terminal of the inverter and an output node, which receives the clock signal and an inverted clock signal that the clock signal is inverted, the output data being provided at the output node.

13. A flip-flop circuit, comprising:

a pulse generator configured to generate a pulse signal based on a clock signal in a normal mode, the pulse signal being synchronized with a rising edge of the clock signal with a delay and having an activation interval shorter than the clock signal;

a dynamic input unit configured to precharge an evaluation node to a power supply voltage in a first phase of the clock signal, and configured to selectively discharge the evaluation node in the normal mode in response to input data and the pulse signal in a second phase of the clock signal; and a latch output unit configured to latch an internal signal provided from the evaluation node to provide an output data, and configured to determine a present state of the output data based on a logic level of the clock signal and a previous state of the output data, wherein the pulse generator is configured to generate at least one pulse during a period of a scan mode in which the output data does not change based on the input data.

14. The flip-flop circuit as claimed in claim 13, wherein the pulse generator comprises:

a delay unit that delays and inverts the clock signal;

a NAND gate that performs an NAND operation on an output of the delay unit and the clock signal; and an inverter that inverts an output of the NAND gate to provide the pulse signal.

15. The flip-flop circuit as claimed in claim 13, wherein the pulse generator comprises:

a delay unit that delays and inverts the clock signal, the delay unit including first through third inverters which are cascade-connected;

a first NAND gate that performs an NAND operation on an output of the delay unit and the clock signal;

a fourth inverter that inverts an output of the first NAND gate to provide the pulse signal; and a second NAND gate that performs an NAND operation on the output of the first NAND gate and an output of the first inverter to provide a delayed clock signal.

16. The flip-flop circuit as claimed in claim 13, wherein the pulse generator comprises:

an inverter that inverts the clock signal;

a delay unit that delays and inverts an output of the inverter; and a NOR gate that performs a NOR operation on outputs of the inverter and the delay unit to provide the pulse signal.

17. The flip-flop circuit as claimed in claim 13, wherein the dynamic input unit comprises:

a PMOS transistor, connected between a power supply voltage and the evaluation node, which has a gate receiving the clock signal;

a data input unit, connected to the evaluation node, which receives the input data; and a NMOS transistor, connected between the data input unit and a ground voltage, which has a gate receiving the pulse signal.

18. The flip-flop circuit as claimed in claim 17, wherein the dynamic input unit further comprises a latch unit, connected between the evaluation node and the latch output unit, which latches the internal signal.

19. A flip-flop circuit, comprising:

a pulse generator configured to generate a pulse signal based on a clock signal in a normal mode, the pulse signal being synchronized with a rising edge of the clock signal with a delay and having an activation interval shorter than the clock signal;

a precharger configured to precharge an evaluation node to a power supply voltage in a first phase of the clock signal, and for selectively discharging the evaluation node in response to the normal mode in response to input data and the pulse signal in a second phase of the clock signal; and an output circuit configured to provide output data by latching an internal signal provided from the evaluation node, and determining a present state of the output data based on a logic level of the clock signal and a previous state of the output data, wherein the pulse generator is configured to generate at least one pulse during a period of a scan mode in which the output data does not change based on the input data.

20. The flip-flop circuit as claimed in claim 19, wherein the pulse generator includes:

a first inverter that inverts the clock signal;

a first NAND gate that performs a NAND operation on a scan enable signal and an inverted signal of the scan input signal, the scan enable signal indicating one of the normal mode and the scan mode;

a second NAND gate that performs a NAND operation on an output of the first NAND gate and an output of the first inverter; and a second inverter that inverts an output of the second NAND gate.

* * * * *